United States Patent
Das et al.

(10) Patent No.: US 8,711,771 B2
(45) Date of Patent: Apr. 29, 2014

(54) SCALABLE HEADER EXTENSION

(75) Inventors: Soumya Das, San Diego, CA (US); Kaushik Chakroborty, San Diego, CA (US); Krishnan Rajamani, San Diego, CA (US); Ozgur Dural, San Diego, CA (US); Samir Salib Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 664 days.

(21) Appl. No.: 12/716,041

(22) Filed: Mar. 2, 2010

(65) Prior Publication Data

US 2010/0226315 A1    Sep. 9, 2010

Related U.S. Application Data

(60) Provisional application No. 61/157,126, filed on Mar. 3, 2009.

(51) Int. Cl.
| | | |
|---|---|---|
| *H04W 4/00* | (2009.01) | |
| *H04L 12/56* | (2011.01) | |
| *H04B 1/00* | (2006.01) | |
| *H04J 3/16* | (2006.01) | |
| *G06F 15/16* | (2006.01) | |
| *H04W 28/06* | (2009.01) | |
| *H04L 29/06* | (2006.01) | |
| *H04N 21/4363* | (2011.01) | |
| *H04W 28/12* | (2009.01) | |

(52) U.S. Cl.
CPC .............. *H04W 28/06* (2013.01); *H04W 28/12* (2013.01); *H04L 69/22* (2013.01); *H04N 21/43637* (2013.01)
USPC ........... 370/328; 370/352; 370/389; 370/392; 370/394; 370/210; 370/206; 370/334; 370/467; 370/539; 375/130; 375/146; 375/295; 455/422.1; 709/246

(58) Field of Classification Search
CPC ...... H04W 28/06; H04W 28/12; H04L 69/22; H04N 21/43637
USPC ........................... 370/328–403; 375/130–295
See application file for complete search history.

(56) References Cited

U.S. PATENT DOCUMENTS

| | | | |
|---|---|---|---|
| 6,456,783 B1 * | 9/2002 | Ando et al. | .................... 386/330 |
| 6,769,000 B1 * | 7/2004 | Akhtar et al. | ......................... 1/1 |

(Continued)

FOREIGN PATENT DOCUMENTS

| | | |
|---|---|---|
| EP | 2026523 A1 | 2/2009 |
| JP | 2003143217 A | 5/2003 |

(Continued)

OTHER PUBLICATIONS

International Search Report and Written Opinion—PCT/US2010/026116, International Search Authority—European Patent Office—Jul. 7, 2010.

(Continued)

*Primary Examiner* — Phirin Sam
*Assistant Examiner* — Venkatesh Haliyur
(74) *Attorney, Agent, or Firm* — Charles E. Eggers

(57) ABSTRACT

Systems and methods for extending header fields are disclosed. The header field may be extended without changing the current size of the header. Reserve bits may be used to indicate the use of an extended header and the extended header may be store in a variety of locations within the frame, including the frame payload or pad bits.

34 Claims, 11 Drawing Sheets

(56) References Cited

U.S. PATENT DOCUMENTS

| | | | |
|---|---|---|---|
| 6,782,474 B1* | 8/2004 | Ylonen | 713/162 |
| 6,912,209 B1* | 6/2005 | Thi et al. | 370/286 |
| 6,934,756 B2* | 8/2005 | Maes | 709/227 |
| 6,985,492 B1* | 1/2006 | Thi et al. | 370/429 |
| 7,023,868 B2* | 4/2006 | Rabenko et al. | 370/419 |
| 7,028,182 B1* | 4/2006 | Killcommons | 713/161 |
| 7,058,728 B1* | 6/2006 | Eklund | 709/247 |
| 7,079,499 B1* | 7/2006 | Akhtar et al. | 370/310 |
| 7,417,989 B1* | 8/2008 | Doran | 370/390 |
| 7,418,194 B2* | 8/2008 | Ando et al. | 386/330 |
| 7,529,675 B2* | 5/2009 | Maes | 704/270.1 |
| 7,567,533 B2* | 7/2009 | Lai | 370/330 |
| 7,586,899 B1* | 9/2009 | Mohaban et al. | 370/352 |
| 7,634,020 B2* | 12/2009 | Batra et al. | 375/295 |
| 7,656,897 B2* | 2/2010 | Liu | 370/467 |
| 7,701,893 B2* | 4/2010 | Sorbara et al. | 370/322 |
| 7,733,866 B2* | 6/2010 | Mishra et al. | 370/393 |
| 7,817,603 B2* | 10/2010 | Liu | 370/334 |
| 7,822,075 B2* | 10/2010 | Liu | 370/539 |
| 7,860,128 B2* | 12/2010 | Niu et al. | 370/474 |
| 7,933,295 B2* | 4/2011 | Thi et al. | 370/493 |
| 8,077,651 B2* | 12/2011 | Thesling | 370/328 |
| 8,238,895 B2* | 8/2012 | Sorbara et al. | 455/422.1 |
| 2001/0033583 A1* | 10/2001 | Rabenko et al. | 370/503 |
| 2002/0061012 A1* | 5/2002 | Thi et al. | 370/352 |
| 2002/0184373 A1* | 12/2002 | Maes | 709/228 |
| 2003/0031467 A1* | 2/2003 | Ando et al. | 386/95 |
| 2004/0052259 A1* | 3/2004 | Garcia et al. | 370/392 |
| 2004/0179507 A1* | 9/2004 | Batra et al. | 370/343 |
| 2004/0250072 A1* | 12/2004 | Ylonen | 713/170 |
| 2004/0264452 A1* | 12/2004 | Mittal | 370/389 |
| 2005/0078598 A1* | 4/2005 | Batra et al. | 370/206 |
| 2005/0117604 A1* | 6/2005 | Villefrance et al. | 370/469 |
| 2005/0169261 A1* | 8/2005 | Williams et al. | 370/389 |
| 2005/0237992 A1* | 10/2005 | Mishra et al. | 370/349 |
| 2006/0041431 A1* | 2/2006 | Maes | 704/270.1 |
| 2006/0095590 A1* | 5/2006 | Miller | 709/246 |
| 2006/0285513 A1* | 12/2006 | Birru | 370/328 |
| 2006/0291468 A1* | 12/2006 | Bopardikar et al. | 370/392 |
| 2007/0014271 A1* | 1/2007 | Lai | 370/342 |
| 2007/0014286 A1* | 1/2007 | Lai | 370/389 |
| 2007/0091896 A1* | 4/2007 | Liu | 370/395.5 |
| 2007/0160012 A1* | 7/2007 | Liu | 370/334 |
| 2007/0178916 A1* | 8/2007 | Sorbara et al. | 455/458 |
| 2007/0195832 A1* | 8/2007 | Liu | 370/539 |
| 2007/0265012 A1* | 11/2007 | Sorbara et al. | 455/446 |
| 2008/0056393 A1* | 3/2008 | Niu et al. | 375/260 |
| 2008/0165709 A1* | 7/2008 | Soliman | 370/280 |
| 2008/0285571 A1* | 11/2008 | Arulambalam et al. | 370/400 |
| 2009/0028142 A1* | 1/2009 | Schmidt et al. | 370/389 |
| 2009/0147787 A1* | 6/2009 | Arulambalam et al. | 370/392 |
| 2009/0232124 A1* | 9/2009 | Cordeiro et al. | 370/349 |
| 2009/0307727 A1* | 12/2009 | Thesling | 725/63 |
| 2010/0220661 A1* | 9/2010 | Mishra et al. | 370/328 |
| 2010/0226315 A1* | 9/2010 | Das et al. | 370/328 |
| 2010/0246600 A1* | 9/2010 | Das et al. | 370/465 |
| 2010/0278111 A1* | 11/2010 | Kashima et al. | 370/328 |
| 2012/0030547 A1* | 2/2012 | Raptis et al. | 714/799 |
| 2012/0069830 A1* | 3/2012 | Shi et al. | 370/338 |
| 2012/0094666 A1* | 4/2012 | Awoniyi et al. | 455/435.1 |
| 2012/0214494 A1* | 8/2012 | Awoniyi et al. | 455/439 |
| 2013/0294347 A1* | 11/2013 | Das et al. | 370/328 |

FOREIGN PATENT DOCUMENTS

| | | | | |
|---|---|---|---|---|
| JP | 2004112791 A | | 4/2004 | |
| JP | 2006222566 A | | 8/2006 | |
| JP | 2007057031 A | * | 3/2007 | |
| JP | 2007124608 A | | 5/2007 | |
| JP | 2007535845 A | | 12/2007 | |
| WO | WO03032584 A1 | | 4/2003 | |
| WO | 2006085365 A1 | | 8/2006 | |
| WO | WO2007057031 A1 | | 5/2007 | |
| WO | WO 2007057031 A1 | * | 5/2007 | H04L 29/06 |

OTHER PUBLICATIONS

Soumya Das et al: "Scalable PLCP header extension within PSDU" Ultra-Wideband, 2009. ICUWB 2009. IEEE International Conference ON, IEEE, Piscataway, NJ, USA, Sep. 9, 2009, pp. 570-574, XP031547659 ISBN: 978-1-4244-2930-1 the whole document.

Taiwan Search Report—TW099106223—TIPO—May 6, 2013.

* cited by examiner

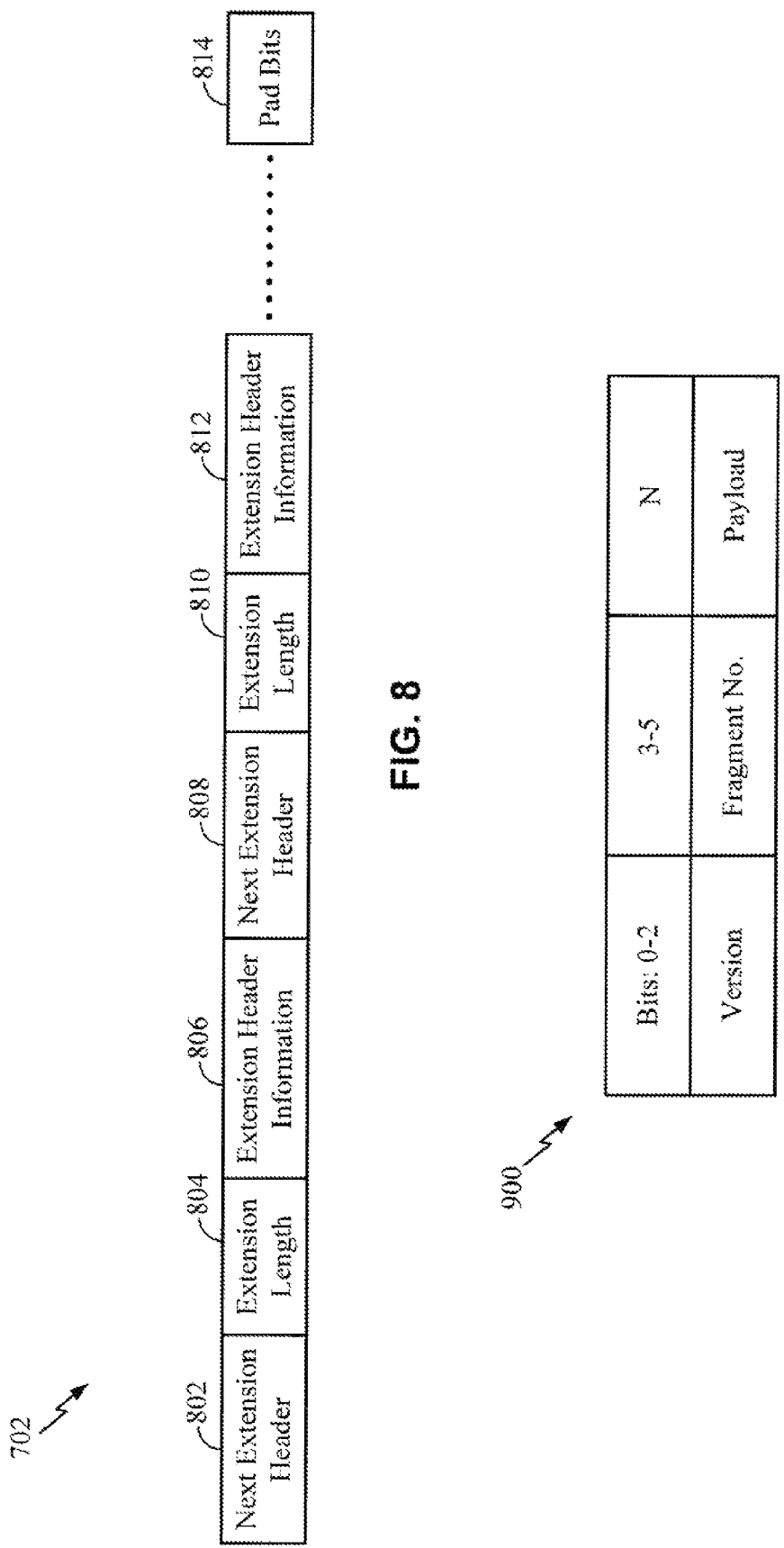

SCALABLE HEADER EXTENSION

CLAIM OF PRIORITY UNDER 35 U.S.C. §119

The present application for patent claims priority to U.S. Provisional Application No. 61/157,126 entitled "SCALABLE HEADER EXTENSION WITHIN PSDU" filed Mar. 3, 2009, and assigned to the assignee hereof and hereby expressly incorporated by reference herein.

BACKGROUND

1. Field

The present application relates generally to wireless communication, and more specifically to systems and methods of extending packet headers in wireless communication.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

SUMMARY

In an embodiment, a communication device for transmitting at least a first packet in a wireless communication system is provided. The first packet comprises a header field, a payload field, and a padding field. The communication device comprises a memory configured to store a first extension header. The device also comprises processor in communication with the memory and configured to determine if at least one bit is available in the first extension header for transmission The one bit is additional to a plurality of bits occupying the header field. The device further comprises a message formatter in communication with at least one of the processor and the memory and configured to indicate in the header field the presence of the first extension header, and insert at least one portion of the first extension header in at least one of the payload field and the padding field of the first packet.

In another embodiment, a communication device for transmitting at least a first packet in a wireless communication system is provided. The first packet comprises a header field, a payload field, and a padding field. The communication device comprises means for storing a first extension header. The device also comprises means for determining if at least one bit is available in the first extension header for transmission. The one bit is additional to a plurality of bits occupying the header field, and the determining means is in communication with the storing means. The device further comprises means for indicating in the header field the presence of the first extension header and inserting at least one portion of the first extension header in at least one of the payload field and the padding field of the first packet. The indicating and inserting means is in communication with the storing means or the determining means.

In another embodiment, a method of communicating at least a first packet in a wireless communication system is provided. The first packet comprises a header field, a payload field, and a padding field. The method comprises storing a first extension header and determining if at least one bit is available in the first extension header for transmission. The one bit is additional to a plurality of bits occupying the header field. The method further comprises indicating in the header field of the first packet the presence of the first extension header and inserting at least one portion of the first extension header in at least one of the payload field and the padding field of the first packet.

In another embodiment, a computer readable product, comprising at least one computer-readable medium is provided. The computer readable product comprises code for causing a computer to determine, at least in part, if at least one bit is available in the first extension header for transmission. The one bit is additional to a plurality of bits occupying the header field. The computer readable product also comprises code (e.g., executable instructions) for causing a computer to indicate in the header field of the first packet the presence of the first extension header and insert at least one portion of the first extension header in at least one of the payload field and the padding field of the first packet.

BRIEF DESCRIPTION OF THE DRAWINGS

FIG. 8 is an example extended PLCP header structure according to a first embodiment.

FIG. 9 illustrates an example coding table for the extension header information field of the extended PLCP header structure of FIG. 8.

DETAILED DESCRIPTION

Figure 1A:
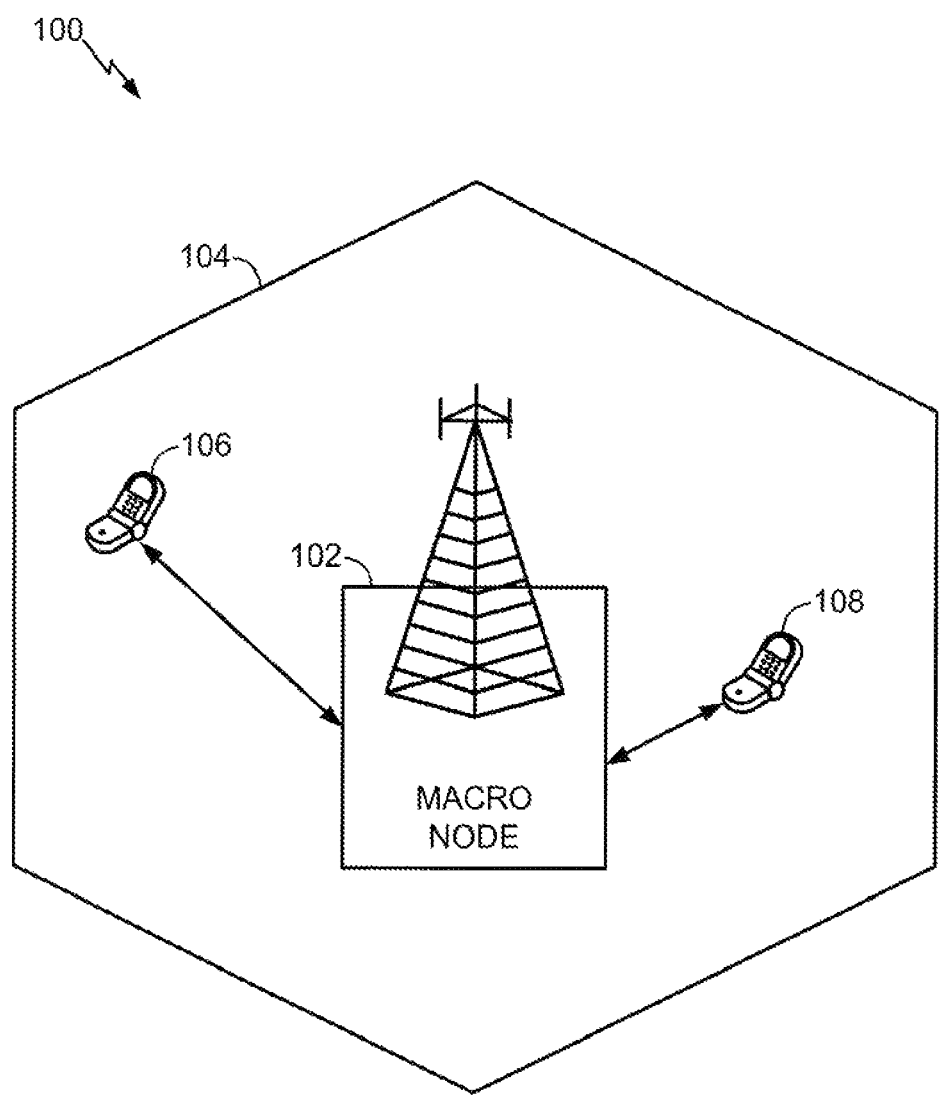
FIG. 1A illustrates a first example wireless communication network.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network that includes macro scale coverage (e.g., a large area cellular network such as a 3rd Generation (3G) networks, typically referred to as a macro cell network) and smaller scale coverage (e.g., a residence-based or building-based network environment). As a wireless communication device moves through such a network, the wireless communication device may be served in certain locations by access nodes that provide macro coverage while the wireless communication device may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node.

FIG. 1A illustrates a first example wireless communication network 100. The illustrated wireless communication network comprises a macro node 102, a cell 104, a wireless communication device 106, and a wireless communication device 108. The wireless communication network 100 is configured to support communication between a number of users. Although the wireless communication network 100 is illustrated as containing only one cell 104, the wireless communication network may comprise any number of cells. Communication coverage in cell 104 may be provided by the macro node 102, which may comprise, for example, a base station. The macro node 203 may interact with a plurality of wireless communication devices, for example, wireless communication devices 106 and 108.

Each of the wireless communication devices may communicate with macro node 102 on a forward link (FL) and/or a reverse link (RL) at a given moment. A FL is a communication link from a macro node to a wireless communication device. A RL is a communication link from a wireless communication device to a macro node. The macro node 102 may be interconnected to macro nodes in other cells (not shown in this figure), for example, by appropriate wired or wireless interfaces. Accordingly, the macro node 102 may communicate with wireless communication devices in other cells (not shown in this figure).

With continuing reference to FIG. 1A, the cell 104 may cover only a few blocks within a neighborhood or several square miles in a rural environment. Each cell may be further divided into one or more sectors (not shown in this figure). By including additional cells, the wireless communication network 100 may provide service over a large geographic region, as is well known in the art.

A wireless communication device (e.g., 106) may be a wireless communication device (e.g., a mobile phone, router, personal computer, server, etc.) used by a user to send and receive voice or data over a communications network. A wireless communication device may be referred to as an access terminal (AT) may also be referred to herein as a user equipment (UE), as a mobile station (MS), or as a terminal device. As shown, wireless communication devices 106 and 108 may comprise mobile phones. However, the wireless communication devices may comprise any suitable communication device.

It may be desirable for a wireless communication device (e.g., 106) to transmit information to and receive information from another wireless communication device, such as wireless communication device 108 or a wireless communication device in another cell (not shown in this figure). The wireless communication device 106 may accomplish this by first communicating with the macro node 102 via a wireless link. For example, the wireless communication device 106 may generate and transmit a message to the macro node 102. The macro node 102 may then generate and transmit a message to another wireless communication device, such as wireless communication device 108. The message may comprise information related to various types of communication (e.g., voice, data, multimedia services, etc.) and may include packets having one or more extension headers, as discussed in detail below with reference to FIGS. 4-13.

Figure 1B:
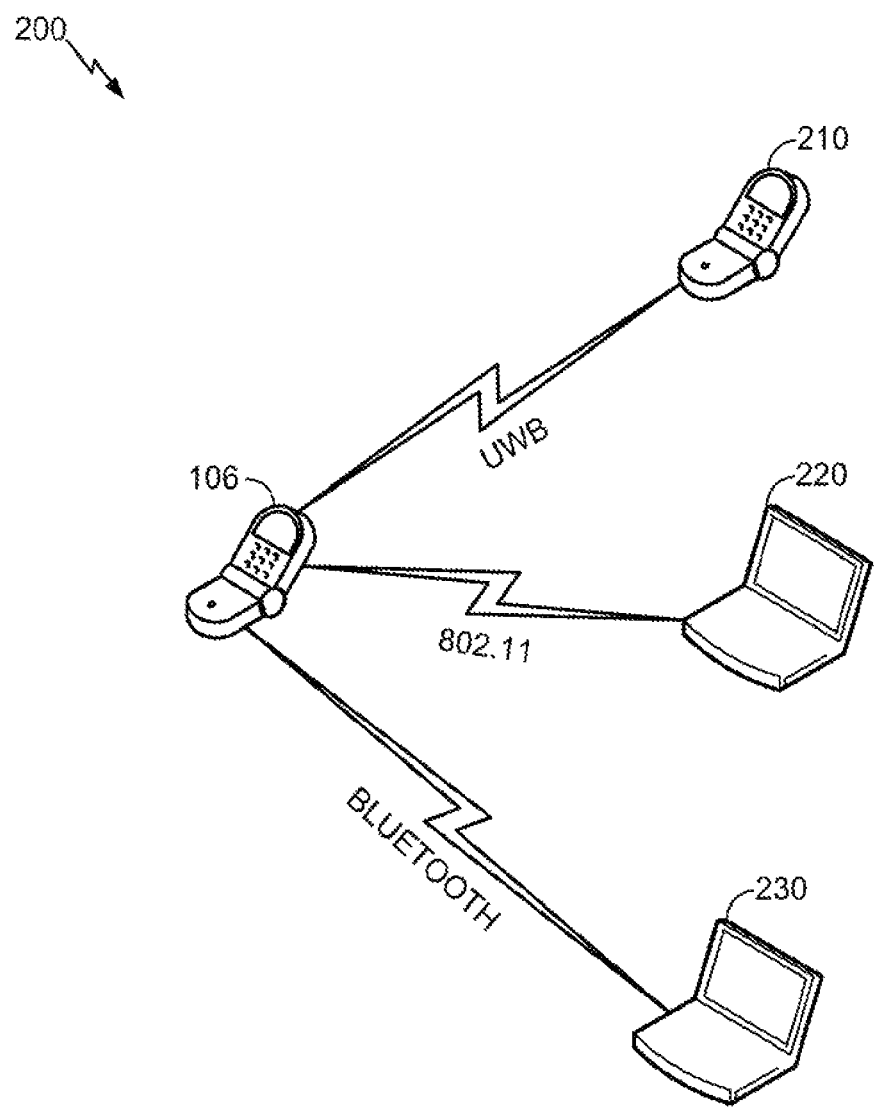
FIG. 1B illustrates a second example wireless communication network.

FIG. 1B illustrates a second example wireless communication network 200. The illustrated wireless communication network 200 comprises the wireless communications device 106, a second wireless communications device 210, a third wireless communications device 220, and a fourth wireless communications device 230. The wireless communication network 200 may be configured to support communication between a multitude of devices, such as the wireless communications devices 106, 210, 220 and 230. The wireless communications devices (e.g., 210, 220) may comprise, for example, personal computers, PDAs, music players, video players, multimedia players, televisions, electronic game systems, digital cameras, video camcorders, watches, remote controls, headsets, and so on. Although the wireless communications device 106 is illustrated in both FIGS. 1 and 2, the wireless communications device 106 need not be in communication with the wireless communication network 200 and the wireless communication network 100 of FIG. 1A simultaneously.

With continuing reference to FIG. 1B, the wireless communications device 106 may communicate with other wireless communications devices (e.g., 210, 220) over a variety of communication channels. The communication channels may comprise Ultra-Wide Band (UWB) channels, Bluetooth channels, 802.11 channels (e.g., 802.11a, 802.11b, 802.11g, 802.11n), infrared (IR) channels, ZigBee (802.15) channels, or a variety of other channels, as is well known in the art. In one embodiment, the channel may be a UWB channel conforming to the ECMA-368 standard.

The wireless communications network 200 may comprise a wireless local area network (WLAN) covering a physical area, like a home, office, or a group of buildings. A WLAN may use standards such as, 802.11 standard (e.g., 802.11g), and/or other standards for wireless communications. A WLAN may use peer-to-peer communication in which the wireless communication devices directly communicate with each other. The wireless communications network 200 may also comprise a wireless personal area network (WPAN), spanning, for example, an area of a few meters. A WPAN may use standards such as infrared, Bluetooth, a WiMedia based UWB standard (e.g., ECMA-368), and ZigBee standards, and/or other standards for wireless communications. A WPAN may use peer-to-peer communication in which the wireless communication devices directly communicate with each other. The wireless communications network 200 may connect to another network, such as the wireless communications network 100 or the Internet, through a device such as the wireless communications device 106.

The messages sent across the wireless communications network 200 may comprise information related to various types of communication (e.g., voice, data, multimedia services, etc.) and may include packets having one or more extension headers, as discussed in detail below with reference to FIGS. 4-12.

Although the following embodiments may refer to FIG. 1B and particularly the ECMA-368 standard, they may also be applicable to the communication system 100 shown in FIG. 1A and other communication standards. For example, one embodiment may be applicable in a UMTS communication system. Another embodiment may be applicable in a OFDMA communication system. Some embodiments may be applied to any communication system which uses padding bits when transmitting data from one wireless communication device to another wireless communication device. Generally, padding bits are bits within a frame (e.g., a unit of data used by a communication system) that are used to "pad" a frame to a certain length. For example, the communication system 200 may require that all frames sent between the wireless communication devices (e.g., 106 and 220) be 256 bits in length. If the wireless communication device 106 only has 128 bits of data to send in a frame, the wireless communication device 106 may use 128 padding bits to fill the rest of the frame such that the total length of the frame meets the 256 bit length requirement.

The ECMA-368 standard specifies a physical layer (PHY) and a medium access control (MAC) sublayer for ultra-wideband (UWB) communication systems. For example, the ECMA-368 standard may be used in a high-speed, short-range wireless network. The ECMA-368 standard may use all or part of the frequency spectrum between 3100-10,600 MHz and may support data rates of up to 480 Mb/s. The ECMA-368 standard divides the spectrum into 14 bands, each with a bandwidth of 528 MHz. The ECMA-368 standard may use a multi-band orthogonal frequency division modulation (MB-OFDM) scheme to transmit information. Frequency-domain spreading, time-domain spreading, and forward error correction (FEC) coding are provided for optimum performance under a variety of channel conditions.

The MAC sublayer of the ECMA-368 standard may allow a group of devices to continue communicating while merging or splitting from other groups of devices. The functionality of this MAC may be distributed among multiple devices. These functions include distributed coordination to avoid interference between different groups of devices by appropriate use of channels and distributed medium reservations to ensure Quality of Service. The MAC sublayer of the ECMA-368 may provide prioritized schemes for isochronous and asynchronous data transfer. To do this, the ECMA 368 standard may use one of Carrier Sense Multiple Access (CSMA) or Time Division Multiple Access (TDMA). The MAC sublayer of the ECMA-368 standard may ensure equitable sharing of the bandwidth.

Figure 2:
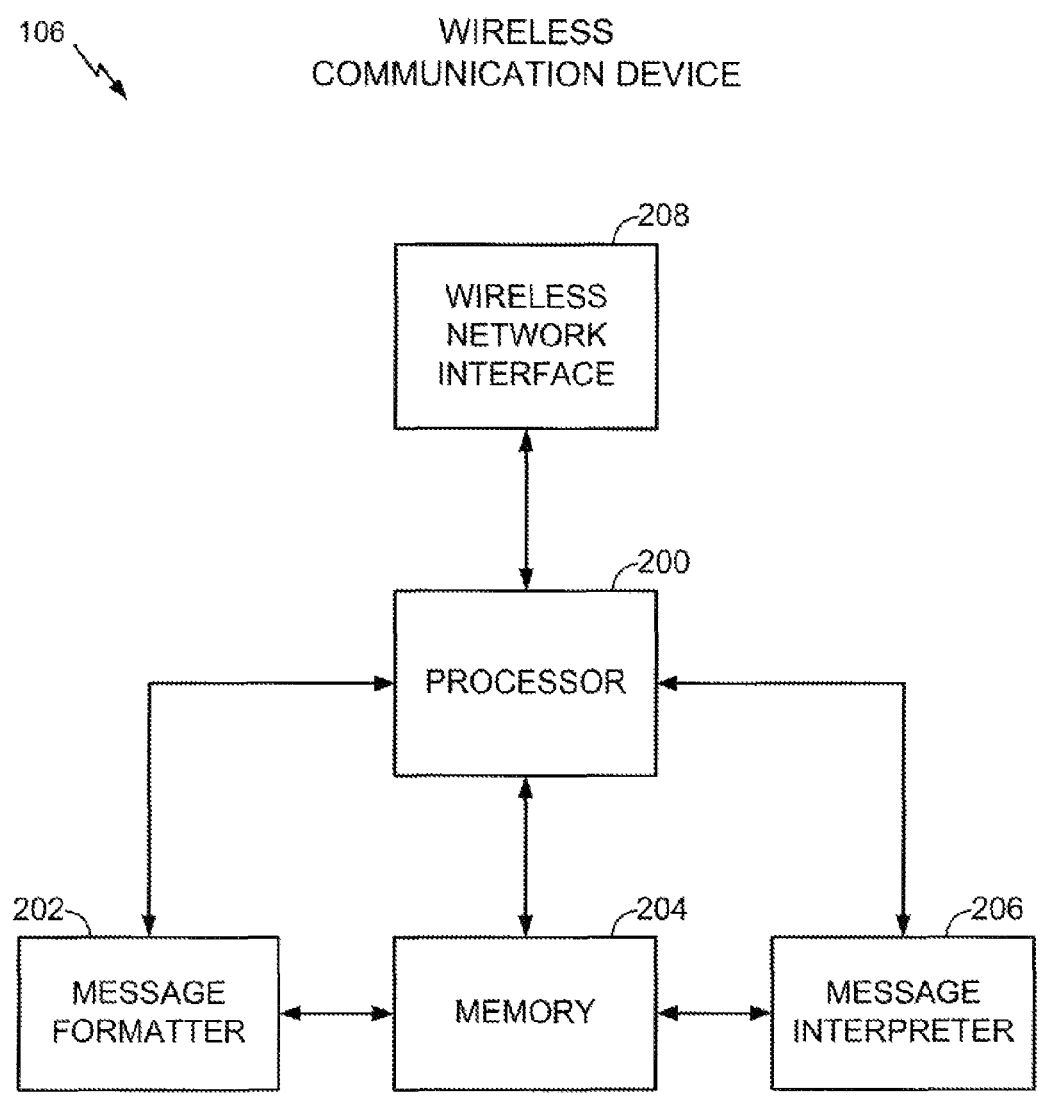
FIG. 2 is a functional block diagram of an example wireless communication device for use in the wireless communication networks of FIG. 1A and FIG. 1B.

FIG. 2 is a functional block diagram of an example wireless communication device 106 shown in FIGS. 1A and 1B. As discussed above, the wireless communication device 106 may be a mobile phone. The wireless communication device 106 may comprise a processor 200 configured to process information for storage, transmission, and/or for the control of other components of the wireless communication device 106. The processor 200 may further be coupled to a memory 204. The processor may read information from or write information to the memory 204. The memory 204 may be configured to store messages before, during or after processing. The memory 204 may also store extension header data and/or one or more packets having extension headers, as will be discussed in further detail below with reference to FIGS. 6-12. The processor 200 may also be coupled to a wireless network interface 208. The wireless network interface 208 may be configured to receive an inbound wireless message from, and transmit an outbound wireless message to a macro node (e.g., 102) and/or to another wireless communication device (e.g., 220). The inbound wireless message may be passed to the processor 200 for processing. The processor 200 may process packets having one or more extension headers.

The processor 200 may process the outbound wireless message passing the outbound wireless message to the wireless network interface 208 for transmission. Additionally, the processor 200 may identify extension headers for sending and include them in the message, as will be discussed in detail below with reference to FIG. 12. The processor 200 may also be coupled to a message interpreter 206. The inbound wireless message received at the wireless network interface 208 from the macro node 102 and/or another wireless communication device (e.g., 220) may be passed to the processor 200 and passed by the processor 200 to the message interpreter 206 for additional processing. The message interpreter 206 may also be coupled to the memory 204 to store or retrieve information for use in message interpreting. The message interpreter 206 may interpret packets having one or more extension headers. In one embodiment, described below with reference to FIGS. 9 and 12, the message interpreter 206 may process one or more fragmented extension headers.

The processor 200 may also be coupled to a message formatter 202. The message formatter 202 may generate or format the outbound wireless message to be transmitted by the wireless network interface 208. The wireless outbound message may be passed by the message formatter 202 to the processor 200 for transmission by the wireless network interface 208 to a macro node (e.g., 102) and/or another wireless communication device (e.g. 220). The message formatter 202 may be coupled directly to the memory 204 in order to store or retrieve information for use in message formatting. The message formatter 202 may insert extension headers or extension header frame check sequence, tail or pad bits into one or more packets, as described in detail below with reference to FIGS. 6-12.

The wireless network interface 208 may comprise an antenna and a transceiver. The transceiver may be configured to modulate/demodulate the outbound/inbound wireless messages going to or coming from the macro node 102 and/or another wireless communication device (e.g. 220). The antenna may transmit/receive the outbound/inbound wireless messages. The antenna may be configured to communicate with the macro node 102 over one or more channels. The outbound/inbound wireless message may comprise voice and/or data-only information (collectively referred to herein as "data"). The wireless network interface 208 may demodulate the data received. The wireless network interface 208 may modulate data to be sent from the wireless communication device 106 via the wireless network interface 208. The processor 200 may provide data to be transmitted.

The memory 204 may comprise processor cache, including a multi-level hierarchical cache in which different levels have different capacities and access speeds. The memory 204 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

Although described separately, it is to be appreciated that functional blocks described with respect to the wireless communication device 106 need not be separate structural elements. For example, the processor 200 and the memory 204 may be embodied in a single chip. The processor 200 may additionally, or in the alternative, contain memory, such as processor registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the wireless communication device 106, such as processor 200, message interpreter 206, and message formatter 202 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the wireless communication device 106 may also be implemented as a combination of computing devices, e.g., a combination of a DSP and a microprocessor, a plurality of microprocessors, one or more microprocessors in conjunction with a DSP communication, or any other such configuration.

Figure 3:
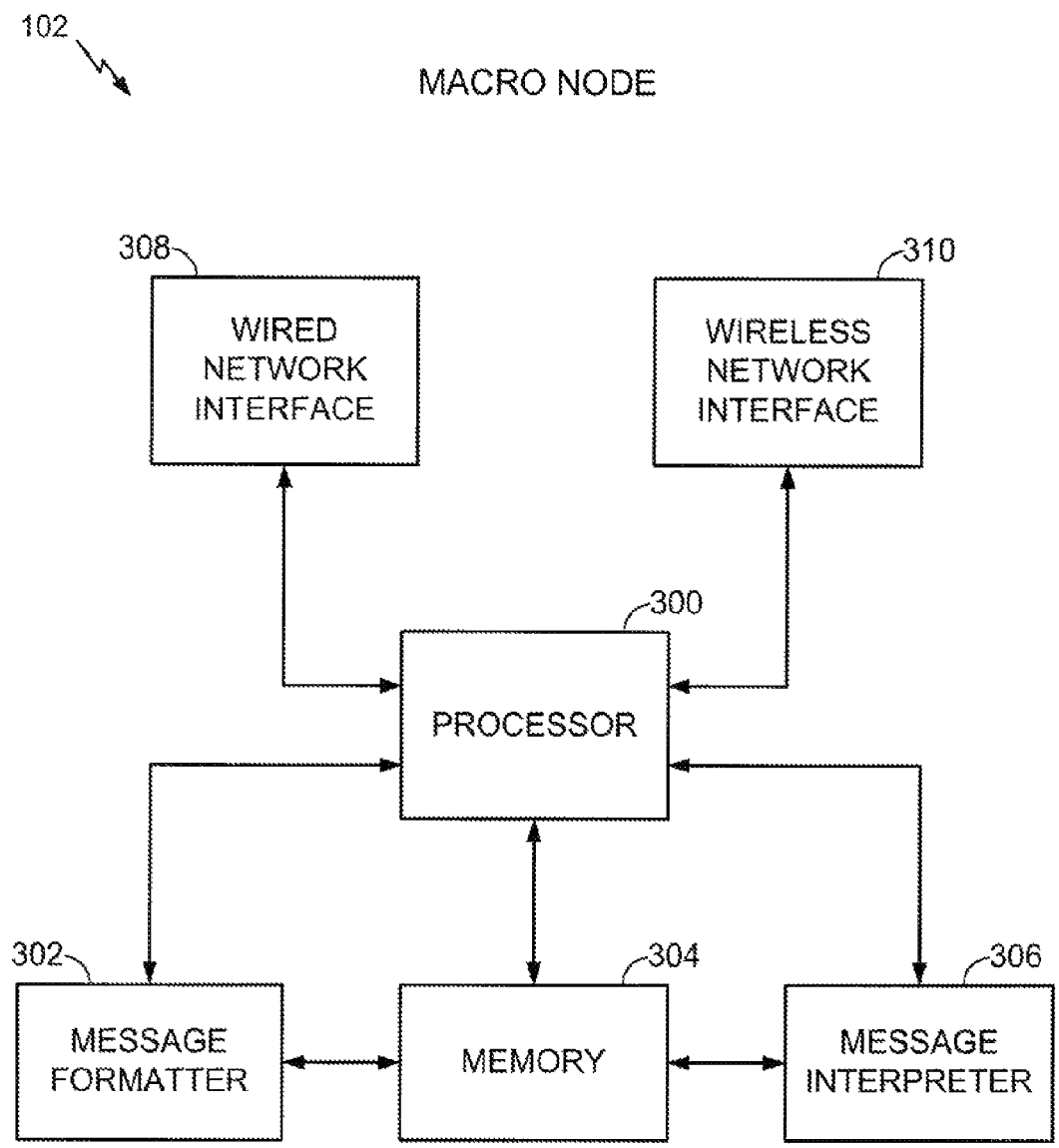
FIG. 3 is a functional block diagram of an example macro node for use in the wireless communication network of FIG. 1.

FIG. 3 is a functional block diagram of an example macro node 102 shown in FIG. 1A. As discussed above with respect to FIG. 1A, the macro node 102 may be a base station. The macro node 102 may comprise a wireless network interface 308 configured to receive an inbound wireless message from and transmit an outbound wireless message to one or more wireless communication devices, such as wireless communication device 106. Wireless network interface 310 may be coupled to the processor 300. The processor 300 may be configured to process the inbound and outbound wireless message coming from or going to the wireless communication device 106 via the wireless network interface 310. The processor 300 may process packets having one or more extension headers.

The processor 300 may also be configured to control other components of the macro node 102. The processor 300 may be further coupled to a wired network interface 308. The wired network interface 308 may be configured to receive an inbound wired message from and to transmit an outbound wired message to other destinations (e.g., other macro nodes and/or wireless communication devices). The wired network interface 308 may receive an inbound wired message and pass the inbound wired message to the processor 300 for processing. The processor 300 may process an outbound wired message and pass the outbound wired message to the wired network interface 308 for transmission.

The processor 300 may further be coupled, via one or more buses, to a memory 304. The processor 300 may read information from or write information to the memory 304. The memory 304 may be configured to store information for use in processing the inbound or outbound, wired or wireless message. The memory 304 may also store extension header data and/or one or more packets having extension headers, as will be discussed in further detail below with reference to FIGS. 6-12. The processor 300 may also be coupled to a message interpreter 306. The processor may pass the inbound wired and wireless message to the message interpreter 306 for processing. The message interpreter 306 may interpret packets having one or more extension headers. In one embodiment, described below with reference to FIGS. 9 and 12, the message interpreter 306 may process one or more fragmented extension headers.

The message interpreter 306 may also be configured to extract information from the inbound wireless message received at the wireless network interface 310. For example, the inbound wireless message received from the wireless communication device may comprise package extension headers. The message interpreter 306 may extract the package extension headers from the inbound wireless message provided by the wireless communication device. The message interpreter 306 may pass this identifying information to the processor 300 for additional processing. In another example, the message interpreter 306 may be configured to process the inbound wireless message and to provide the processor 300 with information for responding to the inbound wireless message by requesting additional information. The message interpreter 306 may also be coupled directly to the memory 304 in order to store or retrieve information for use in message interpretation.

The processor 300 may also be coupled to a message formatter 302. The message formatter 302 may be configured to generate the outbound wired or wireless message. The message formatter 302 may be further configured to pass the generated outbound wired or wireless message to the processor 300. The message formatter 202 may insert extension headers or extension header frame check sequence, tail or pad bits into one or more packets, as described in detail below with reference to FIGS. 6-12.

The processor 300 may pass the outbound wired or wireless message to the wired network interface 308 or the wireless network interface 310 for transmission. Additionally, the processor 300 may identify extension headers for sending and include them in the message, as will be discussed in detail below with reference to FIG. 12. The wired network interface 308 may transmit the outbound wired message to another macro node. The message formatter 302 may pass the outbound wireless message to the processor 300. The processor 300 may pass the outbound wireless message to the wireless network interface 310 for transmission to the wireless communication device 106. The message formatter 302 may also be coupled directly to the memory 304 in order to store or retrieve information for use in message formatting.

The wireless network interface 310 may comprise an antenna and a transceiver. The transceiver may be configured to modulate/demodulate the outbound/inbound wireless messages going to or coming from a wireless communication device. The antenna may transmit/receive the inbound/outbound wireless messages. The antenna may be configured to send and/or receive the outbound/inbound wireless messages from the macro node 102 over one or more channels. The outbound/inbound wireless messages may comprise voice and/or data-only information (collectively referred to herein as "data") and may include one or more packets having extension headers. The wireless network interface 310 may demodulate the data received. The wireless network interface 310 may modulate data to be sent from the macro node 102 via the wireless network interface 310. The processor 300 may provide data to be transmitted.

The wired network interface 308 may comprise a modem. The modem may be configured to modulate/demodulate the outbound/inbound wired message going to or coming from another destination/source, such as another macro node. The wired network interface 308 may demodulate the data received according to one or more wired standards using methods known in the art. The demodulated data may be transmitted to the processor 300. The wired network interface 308 may modulate data to be sent from the macro node 102 via the wired network interface 308 according to one or more wired standards using methods known in the art. The processor 300 may provide data to be transmitted.

The memory 304 may comprise a processor cache, including a multi-level hierarchical cache in which different levels have different capacities and access speeds. The memory 304 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives Although described separately, it is to be appreciated that functional blocks described with respect to the macro node 102 need not be separate structural elements. For example, the processor 300 and the memory 304 may be embodied in a single chip. The processor 300 may additionally, or in the alternative, contain memory, such as processor registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the macro node 102, such as processor 300, message interpreter 306, and message formatter 302, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the macro node 102 may also be implemented as a combination of computing devices, e.g., a combination of a DSP and a microprocessor, a plurality of microprocessors, one or more microprocessors in conjunction with a DSP communication, or any other such configuration.

The functionality of the modules of FIGS. 2-3 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. The functionality described herein (e.g., with regard to one or more of the accompanying figures) may correspond in some aspects to similarly designated "means for" functionality in the appended claims. Referring to FIGS. 1-3, the macro node 102 and the wireless communication device 106 are represented as a series of interrelated functional modules.

Figure 4:
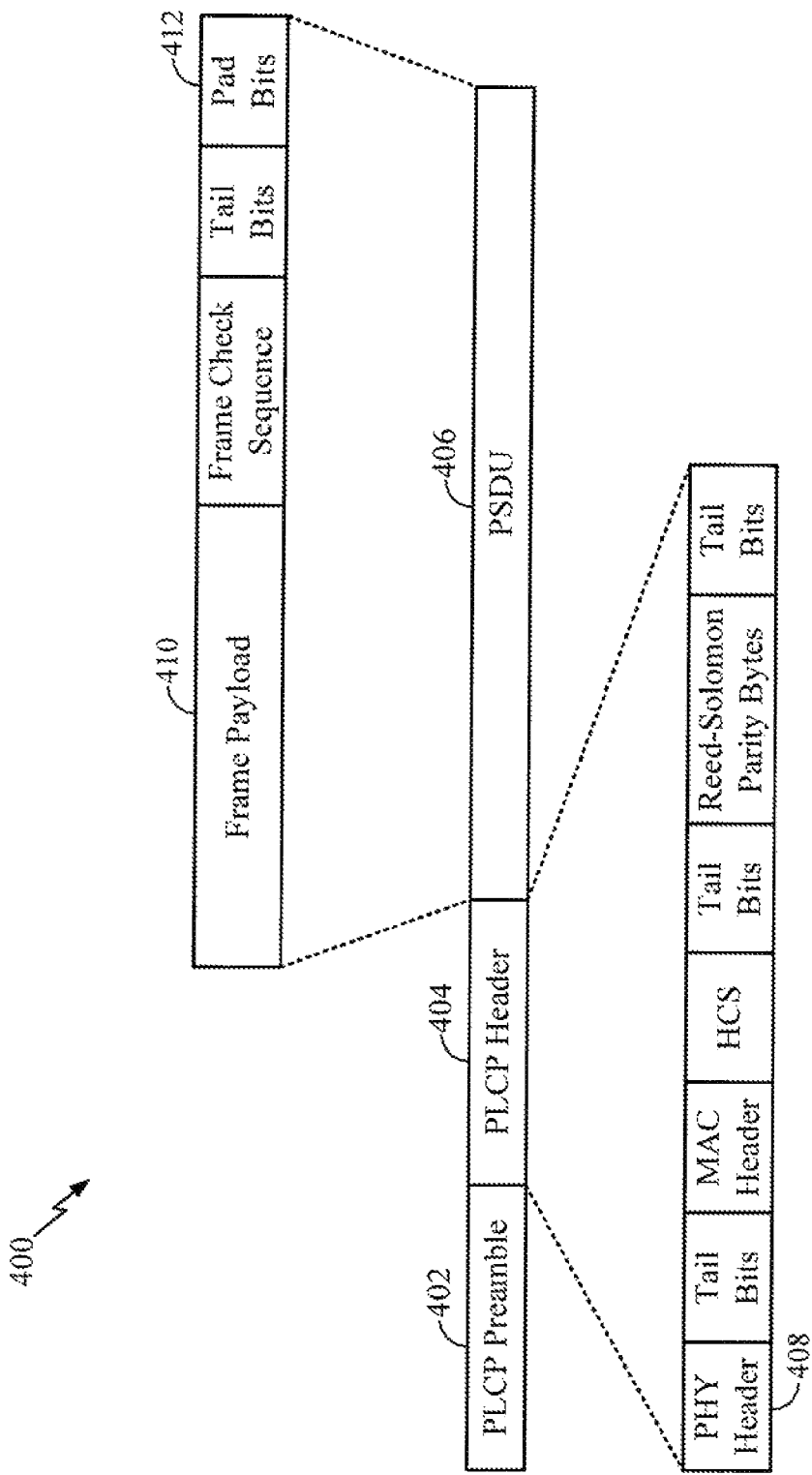
FIG. 4 illustrates an example frame structure conforming to the ECMA-368 standard.

FIG. 4 illustrates an example frame structure conforming to the ECMA-368 standard. The physical layer convergence protocol (PLCP) protocol data unit or PPDU or frame structure 400 comprises a PLCP preamble 402, a PLCP header 404 and a physical layer service data unit or PSDU 406. The ECMA-368 standard defines an ultra wide band physical (PHY) layer and medium access control (MAC) sublayer to support a wireless communication network (e.g., 100). Thus, in one embodiment a wireless communication device (e.g., 106) may have, for example, a wireless network interface (e.g., 208) and/or processor (e.g., 200) configured to receive an inbound wireless message from and transmit an outbound wireless message to one or more other wireless communication devices (e.g., 210, 220, and 230) using the ECMA-368 standard. The PSDU 406 may include bits of data related to various types of communications (e.g., voice, data, multimedia services, etc.) contained in a packet sent to and/or from a wireless communication device (e.g., 106) and another wireless communication device (e.g., 220). It will be understood that although the wireless communication network 200 may utilize the ECMA-368 standard, this selection is merely illustrative, and the embodiments described below with reference to FIGS. 6-13 are applicable to communication networks utilizing a variety of standards.

As illustrated in FIG. 4, the PSDU 406 comprises a frame payload 410, a frame check sequence, tail bits, and pad bits 412. The frame payload 410 may comprise bits of data related to various types of communications (e.g., voice, data, multimedia services, etc.) contained in a packet sent to and/or from a wireless communication device (e.g., 106) to another wireless communication device (e.g., 220). The frame check sequence provides checksum characters for the frame to aid in error detection and correction. In embodiments where the wireless network interface (e.g., 208 or 308) contains a convolution decoder, the tail bits may be added to flush out the decoder so as to reset it to its initial state and improve error probability. The ECMA-368 standard provided that the bit stream be interleaved prior to modulation to provide robustness against burst errors. Accordingly, the standard provides for the pad bits 412 to ensure the PSDU 406 is aligned on the boundary of the interleaver.

With continuing reference to FIG. 4, the PLCP preamble 402 may aid the wireless network interface (e.g., 208 or 308) in timing synchronization, carrier-offset recovery, and channel estimation. The PLCP preamble 402 in the ECMA-368 standard consists of a packet/frame synchronization sequence followed by a channel estimation sequence.

The PLCP header 404 may convey information to a wireless network interface (e.g., 208 or 308) for use in decoding the PSDU 406. As illustrated in FIG. 4, the PLCP header 404 comprises a PHY header 408, a MAC header, a header check sequence, Reed-Solomon parity bytes, and three fields of tail bits. The PHY header 408 will be discussed in detail below with reference to FIG. 5. The header check sequence and Reed-Solomon parity bytes provide improved error detection and correction for the PLCP header 404. Additionally, in embodiments where the wireless network interface contains a convolution decoder, the tail bits may be added to flush out the decoder so as to reset it to its initial state and improve error probability. In the ECMA-368 standard, the MAC header is scrambled with the header check sequence prior to transmission in order to decrease the probability of transmission error.

Figure 5:
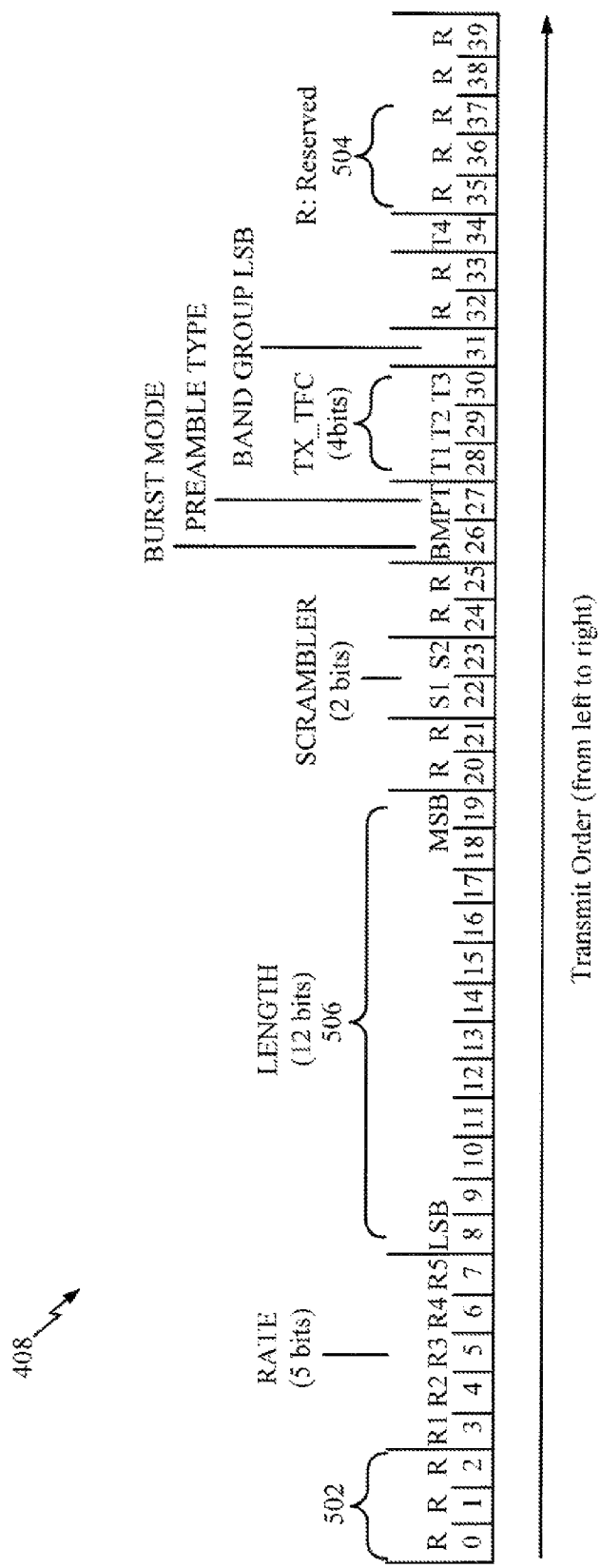
FIG. 5 illustrates a physical layer bit assignment for the frame structure of FIG. 4.

FIG. 5 illustrates a PHY header bit assignment for the frame structure of FIG. 4. The PHY header 408 includes a length field 506, which indicates the length of the frame payload (e.g., 410) not including the frame check sum, tail bits or pad bits. The PHY header 408 also includes reserved bits. These bits are reserved in the ECMA-368 standard for future use and are set to zero in the current standard. For purposes of illustration only, the PHY header 408 includes a first reserved field 502 and a second reserved field 504.

The first reserved field 502 and second reserved field 504 may be used in one or more embodiments, as described below. In one embodiment, the first reserved field 502 is used to indicate the presence and content of one or more extensions headers, as described below in detail with reference to FIGS. 6-13. In another embodiment, the second reserved field 504 is used to keep the transmitter (e.g., 208 or 308) and receiver (e.g., 208 or 308) synchronized with respect to the CSI. In particular, there may be a version number of the extension header being used for the current PSDU transmission in the second reserved field 504 of the PLCP header 404. The interval between successive feedbacks ensures that there will be no issue when the version number wraps around after eight feedbacks. Although the embodiments described above are illustrated in the context of the first reserved field 502 and the second reserved field 504, the embodiments described are applicable to any of the reserved bits.

The PLCP header 404 of FIG. 4 includes both the PHY and MAC header. Although the embodiments described below with reference to FIGS. 6-13 are applicable to frame structures that have a common PHY header and MAC header such as in the ECMA-368 and ECMA-387 standards, the embodiments are also applicable to a variety of frame structures, including those with a limited number of reserved bits available for PHY header extension. Another embodiment may also be applicable to communication systems and/or standards with separate PHY and MAC headers (e.g., 802.11 standards).

In certain communication systems, it may be desirable to extend the PHY header 408 and the MAC header to accommodate for more fields for next generation equipment designs. Such next generation equipment would typically require more header data than existing or predecessor equipment. It may be also desirable to extended headers to provide a control channel incurring zero or minimal overhead. For example, the control information in ECMA-368 may be sent in one of three ways—as beacons, command or control frames, or piggybacked with other traffic. Beacons may be sent once every 65.536 ms in the ECMA-368 standard which may be less frequent than needed. On the other hand, control and command frames require separate Distributed Reservation Protocol (DRP) reservations and result in more overhead with separate preamble, header, and interframe spacing. Since each pair of transmitter and receiver requires separate DRP reservations for sending their frames, this method does not scale well with number of devices. Thus, there is a need to extend the PHY header 408 and the MAC header to provide a control channel incurring zero or minimal overhead. In another embodiment, prioritized contention access (PCA) may be used to send command and control information and/or frames. In a system using PCA, different devices (e.g., wireless communication devices 106 and 220) may compete against each other to transmit frames (e.g., command and control frames) during a certain time period. Some types of frames (e.g., data packets) may be given a higher priority. The highest priority frame and/or frames may be transmitted during the contested time period.

Generally, there maybe a limited number of bits available or reserved in existing headers, but such reserved bits may not be sufficient to accommodate for header extensions. Extending the header field itself beyond those reserved bits (e.g., adding header bits to the header field) may not keep the header compatible with legacy devices as the legacy devices may not be able to decode the new header and verify a header check sequence. Accordingly, a scalable header extension structure that allows for header extension beyond the reserved bits which is also compatible with legacy devices may be desirable. A scalable header extension structure according to a certain embodiment may allow the extension headers to be transmitted and/or received without increasing the duration of the frame. Transmitting the header extension without increasing the frame duration may help facilitate compatibility with legacy devices. Another embodiment may allow extension headers(s) to be transmitted without needing additional time slots (e.g., without extending the reservation duration and/or transmitting the extension headers as additional frames) to transmit the extension header data/information. In one embodiment, overhead such as a separate preamble, header, and interframe spacing may be reduced. This may increase the efficiency in the use of the system. In another embodiment, padding bits (bits which are only used to "pad" a frame to a certain length) may be used. Using these padding bits may allow generally non-useful bits to be used to transmit data, such as header extension data. This may also increase the efficiency in the use of the system, as previously non-useful bits may be used to transmit data.

Figure 6:
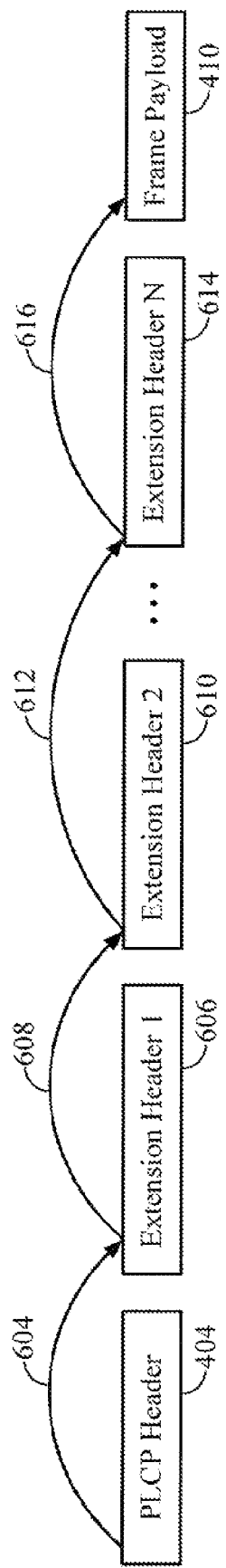
FIG. 6 is an example scalable header extension structure according to an illustrative embodiment.

FIG. 6 is an example scalable header extension structure according to an illustrative embodiment. The exemplary scalable header extension structure 600 comprises the PLCP header 404, a first extension header 606, a second extension header 610, a Nth extension header 614, and the actual frame payload 410. Each extension header may point to another extension header or to the actual frame payload 410 by using one or more indicator bits.

Despite the limited number of reserved bits in the PLCP header 404 as discussed above, a wireless communication device (e.g., 106) may create a scalable header extension structure 600 by inserting one or more extension headers in front of the actual frame payload 410 when needed. A processor (e.g., 200 or 300) may create the scalable header extension structure 600. Extension headers may be used to send various types of information or content over a wireless communication network (e.g., 100), as will be discussed in detail below. The information or content may be sent to and/or from a wireless communication device (e.g., 106) to another wireless communication device (e.g., 210, 220, or 230).

The extension headers may be used to send various types of information or content. For example, one or more of the extension headers might be used to send information not needed to decode the current PSDU, or non-critical content not needing the robustness of its own PLCP header. In one embodiment, the extension header includes information that is sent optionally on a best effort basis when there is not enough room in the PSDU. In another embodiment, the extension header includes content received by a wireless network interface (e.g., 208 or 308) over multiple frames. A memory of a wireless communication device (e.g., 106) may store the extension headers.

The extension headers may also be used to send control information. For example, the information could comprise channel state information (CSI) feedback for adaptive allocation of resources by the wireless network interface (e.g., 208 or 308). In particular, the information include content directed toward transmit power, data rates, modulation or coding. In one embodiment, the extension header includes local link scheduling information. In another embodiment, the extension header includes out of band control information. Although reference has been made to the extension header being used to send certain types of content, the extension headers may be used to send any type of information, including other control information not listed above.

With continuing reference to FIG. 6, in one embodiment, the presence of the first extension header 606 is indicated by reserved bits in the PLCP header 404. For example, with reference back to FIG. 5, the first reserved field 502 of the PHY header 408 could be used to indicate whether or not the first extension header 606 is present. The bits used for indication may comprise one or more other bits, including any of the reserved bits of the PRY header 408. In one embodiment, the bits used for indication indicate the presence and content of the first extension header 606, as will be described below with reference to Table 1. The bits used for indication may be inserted by a processor (e.g., 200 or 300) or a message formatter (e.g., 202 or 302).

TABLE 1

| Next Extension Header | Extension Header Content |
|---|---|
| 0 | No More Extension Header |
| 1 | CSI |
| 2 | Link Scheduling |
| 3 | Out of Band Control Information |
| 4-7 | Reserved |

Table 1 demonstrates one possible encoding scheme for indicating the presence and content of the next extension header. For example, the presence of the first extension header 606 may be indicated by one or more reserved bits of the PLCP header 404 as described above. In the illustrated encoding scheme using three bits, the value of the encoded bits may be used to determine the presence and content of the first extension header 606. For example, if the encoded value of the bits were one, this may indicate that the first extension header 606 comprises CSI content. Similarly, if the encoded value of the bits were zero, this may indicate that the first extension header 606 is not present, and that the actual frame payload 410 immediately follows the PLCP header 404.

With continuing reference to FIG. 6 and Table 1, the bits indicating the presence of the second extension header 610 may comprise one or more bits of the first extension header 606. The bits used for indicating the second extension header 610 may be encoded using the encoded scheme described in Table 1. Thus, if the encoded value of the indicator bits corresponding to the second extension header 610 were two, this may indicate that the second extension header 610 comprises link scheduling content. Similarly, if the encoded value of the bits were zero, this may indicate that the second extension header 610 is not present, and that the actual frame payload 410 immediately follows the first extension header 606. Bits indicating the presence of the Nth extension header 614 may be implemented in a similar manner using the encoding scheme of Table 1.

The scalable header extension structure 600 described above corresponds to a daisy-chain of extension headers. One or more indicator bits in the PLCP header 404 may point to the first extension header 606, as shown in the abstract by the first arrow 604. Likewise, one or more indicator bits in the first extension header 606 may point to the second extension header 610, as shown in the abstract by the second arrow 608. Analogously, third arrow 612 and fourth arrow 616 may be used to further represent the daisy-chain of extension headers in the abstract. Other scalable header extension structures besides a daisy-chain are possible. For example, one or more reserved bits in the PLCP header 404 may indicate whether or not extension headers are present and/or the number of extension headers present. In one embodiment, if the bits indicate the presence of one or more extension headers, a field containing an array of header extension indicator fields may be placed after the PLCP header 404.

Figure 7:
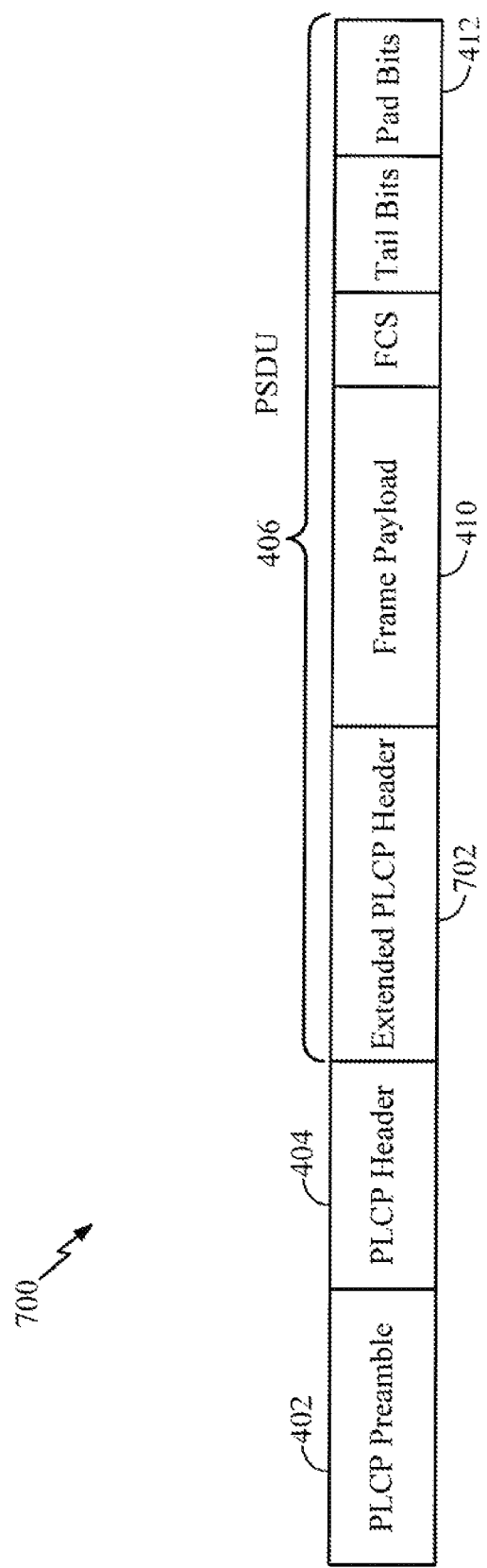
FIG. 7 illustrates an example modified ECMA-368 frame structure in accordance with the scalable header extension structure of FIG. 6.

FIG. 7 illustrates an example modified ECMA-368 frame structure in accordance with the scalable header extension structure of FIG. 6. The modified frame structure 700 comprises the PLCP preamble 402, the PLCP header 404, an extended PLCP header 702 and the PSDU 406. In contrast to the frame structure defined by the ECMA-368 standard (e.g., 400), the modified frame structure 700 includes the extended PLCP header 702 inserted into the payload of the PSDU 406 between the PLCP header 404 and the actual frame payload 410. The PLCP header 702 may be inserted by using a daisy chain of extension headers as described above with reference to FIG. 6.

In the ECMA-368 standard, the maximum PSDU length is 4095 bytes, corresponding to a maximum value of the 12-bit length field 506, illustrated in FIG. 5. In one embodiment, the extended PLCP header 702 is inserted into payload of the PSDU 406 before the actual frame payload 410, and the length field 506 indicates the length of the actual frame payload plus the length of the extended PLCP header. A message formatter (e.g., 202 or 302), and/or a processor (e.g., 200 or 300) could perform this insertion.

Although the illustrated extended PLCP header 702 is shown as being inserted into the payload of the PSDU 406 between the PLCP header 404 and the actual frame payload 410, the extended PLCP header 702 may be inserted in a variety of ways. For example, in one embodiment, the extended PCLP header 702 is inserted into the pad bits 412, as discussed below.

In the current ECMA-368 system, padding bits may be inserted in order to align the data stream on the boundary of the symbol interleaver. For example, ECMA-368 provides that pad bits are inserted so that the data stream is aligned on 6 orthogonal frequency division modulation (OFDM) symbol boundaries. In one embodiment, one or more extension headers are sent in the pad bits 412 of the PSDU 406.

For illustrative purposes only, it is useful to consider the following probabilistic model of sending extension headers in the pad bits 412. Additional details of the model may be found in Das et al., Scalable PLCP Header Extension within PSDU, ICUWB 2009, which is herein incorporated by reference in its entirety. Let the number of pad bits 412 in a given frame be x, and the total length of the extension header elements desired to be inserted in the pad bits 412 be A bits. For the purposes of this model, x may be modeled as a uniform probability distribution.

Thus x may vary from 0 to P-1, where P corresponds to the number of information bits in 6 OFDM symbols at a given PHY data rate at which the frame payload is transmitted. The number of information bits in 6 OFDM symbols is defined by the ECMA-368 standard, and varies with data rate, as shown below in Table 2.

TABLE 2

| Data Rate (Mb/s) | Bits per 6 OFDM Symbols (P) |
|---|---|
| 53.3 | 100 |
| 80 | 150 |
| 106.7 | 200 |
| 160 | 300 |
| 200 | 375 |
| 320 | 600 |
| 400 | 750 |
| 480 | 900 |

If A<P we may partition the range of x into two parts. In the first partition, x<A and the extension header does not fit in the pad bits 412. If the extension header were inserted into the pad bits 412, additional padding bits would be needed to align the data stream on 6 OFDM symbol boundaries as required by the ECMA-368 standard. In the second partition, x≥A and the extension header will fit in the pad bits 412. Thus, A/P is the probability that the extension header will not fit in the pad bits 412 without having to extend the PSDU 406. In one embodiment, when A/P is small, an extension header is unconditionally placed in the pad bits 412. Although the PSDU 406 must be extended in a small fraction of transmissions, the overhead of PLCP preamble and PLCP header is amortized, as will be described below with reference to FIG. 13. In another embodiment, the extension header is placed in the pad bits 412 only when then the extension header fits in the pad bits 412. In yet another embodiment, if the extension header does not fit into the fields available for padding, an extension header fragment fitting in the pad bits 412 is sent, as will be described below with reference to FIG. 9.

If A≥P the PSDU duration must be extended. In particular, the PSDU must be extended by $$\left[\text{floor}\left(\frac{A}{P}\right)+y\right]$$

number of 6 symbol durations, where, y=0 if mod(A,P)≤x<P and y=1 if 0≤x<mod(A,P). Thus in this case, we always incur floor (A/P) number of additional 6 symbol durations and probabilistically on $$\frac{\text{mod}(A, P)}{P}$$

occasion we incur an additional 6 symbol duration. In one embodiment, the extension header may not fit in the available padding bits which may result in extending the duration of the PSDU unconditionally in the pad bits 412. Although the PSDU 406 must be extended by one or more additional 6 symbol durations, the overhead of PLCP preamble, PLCP header and inter-frame spacing may be amortized.

Although inserting the extended PCLP header 702 into the pad bits 412 was described above with reference to a particular model, this was for illustrative purposes only, and was not intended to limit the embodiments described above in any way.

FIG. 8 is an example extended PLCP header structure 702 according to a first embodiment. The illustrated extended PLCP header 702 includes a first extension header having a first extension header indicator 802, a first extension length 804, and first extension information 806. The extended PLCP header 702 may also include a second extension header having a second extension header indicator 808, a second extension length 810, and second extension information 812. The extended PLCP header 814 further includes pad bits 814, located after all extension headers. Although the illustrated PLCP header 702 includes at least two extension headers, the PLCP header structure could include any number of extension headers. For example, in one embodiment, the PLCP header 702 may include one, two, or three extension headers. In another embodiment, the PLCP header structure may include no extension header.

The illustrated extended PLCP header 702 may be used in the embodiments described above with reference to FIGS. 6-7. The first extension header indicator 802 may be implemented as described above with reference to FIG. 6 and Table 1. In particular, an extension header indicator (e.g., 802 or 804) may indicate the presence and content of a subsequent extension header as described above. Reserved bits in the PLCP Header (e.g., 404) may indicate the presence of the first extension header. Other extension header indicators (e.g., 806) may be in the preceding extension headers.

The illustrated extended PLCP header 702 includes the first extension length 804 and the second extension length 806. The first extension length 804 may indicate the length of the first extension information 806. Similarly, the second extension length 810 may indicate the length of the second extension information 812. In one embodiment, the extension length is 10 bits and indicates the length of the extension header information in bits.

With continuing reference to FIG. 8, the illustrated extended PLCP header 702 includes the pad bits 814. The pad bits 814 may be used to byte align the one or more extension headers. In some embodiment the pad bits 814 may not be needed. For example, if the extension length indicates the length of the extension header in bytes, the extension headers are automatically byte aligned.

In one embodiment, the extension length fields are used by a message interpreter (e.g., 206 or 306) and/or processor (e.g., 200 or 300) to speed up time sensitive processing. In particular, the extension length fields provide the flexibility to process extension header elements off-line as needed. To locate the start of the payload, the message interpreter (e.g., 206 or 306) and/or processor (e.g., 200 or 300) may use the length fields to skip over extension header information to reach the start of the actual frame payload.

FIG. 9 illustrates an example coding table for the extension header information field of the extended PLCP header structure of FIG. 8. The illustrated extension header information 900 comprises a version field, a fragment field, and a payload field. The extension header information 900 illustrates one of many possible formats for extension information (e.g., 806 or 812).

The version field may be used to keep the transmitter and receiver synchronized with respect to updates in extension header information. For example, if the extension header is being used to communicate CSI, the version field may indicate a specific version of CSI. In one embodiment, the version field is three bits.

With continuing reference to FIG. 9, the fragment number field may be used if the entire extension header does not fit in the current PSDU. For example, as described above with reference to FIG. 7, the maximum PSDU length is 4095 bytes in the ECMA-368 standard. Accordingly, some extension headers may be too large to fit into a given PSDU since the length field in the PLCP header generally indicates the length of the payload plus the length of the extension headers. The fragment number field may allow the extension header to be sent in more than one PSDU. Additionally, as described above with reference to FIG. 7, in some embodiments one or more extension headers may be placed in the pad bits 412. If an extension header does not fit into the pad bits 412, an extension header fragment having a fragment number field may be inserted into the pad bits 412 and sent instead.

The payload field may contain the information or content of the extension header. This information may include CSI, link scheduling, out of band control, or a variety of other types of content as described above with reference to FIG. 6. In one embodiment, the length of the payload field is specific to the header extension type. For example, with reference back to Table 1, the length of the payload field may vary depending on whether the extension header contained CSI, link scheduling or out of band control content.

Figure 10:
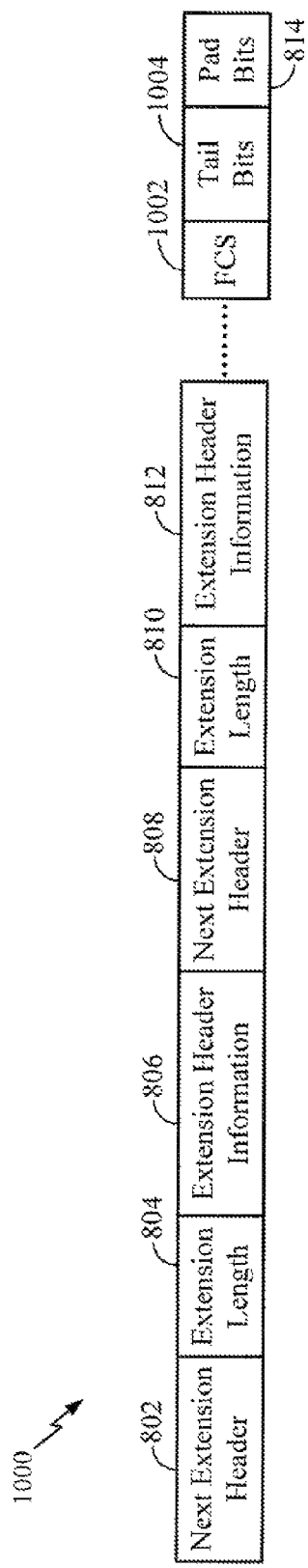
FIG. 10 is an example extended PLCP header structure according to a second embodiment.

FIG. 10 is an example extended PLCP header structure according to a second embodiment. The illustrated extended PLCP header 1000 includes a first extension header having a first extension header indicator 802, a first extension length 804, and first extension information 806. The extended PLCP header 1000 also includes a second extension header having a second extension header indicator 808, a second extension length 810, and second extension information 812. The extended PLCP header 814 further includes a frame check sequence 1002, tail bits 1004, and pad bits 814, located after the extension headers. Although the illustrated PLCP header 1000 includes at least two extension headers, the PLCP header structure could include any number of extension headers.

The illustrated extended PLCP header 1000 may offer improved error detection and correction as compared to the extended PLCP header 702 of FIG. 8. The addition of the frame check sequence 1002 and the tail bits 1004 to the extended PLCP header may decouple errors in the actual frame payload from errors in the extension header.

The frame check sequence 1002 provides checksum characters specific to the extended PLCP header 1000 to improve error detection and correction. In one embodiment, the frame check sequence 1002 is 32 bits. If the wireless network interface (e.g., 208 or 308) contains a convolution decoder, the tail bits 1004 may be added to flush out the decoder so as to reset it to its initial state and improve error probability. In particular, the addition of the tail bits 1004 may decouple the error in the actual frame payload from the error in the extension header and are especially beneficial when prefixed to a large frame payload.

Figure 11:
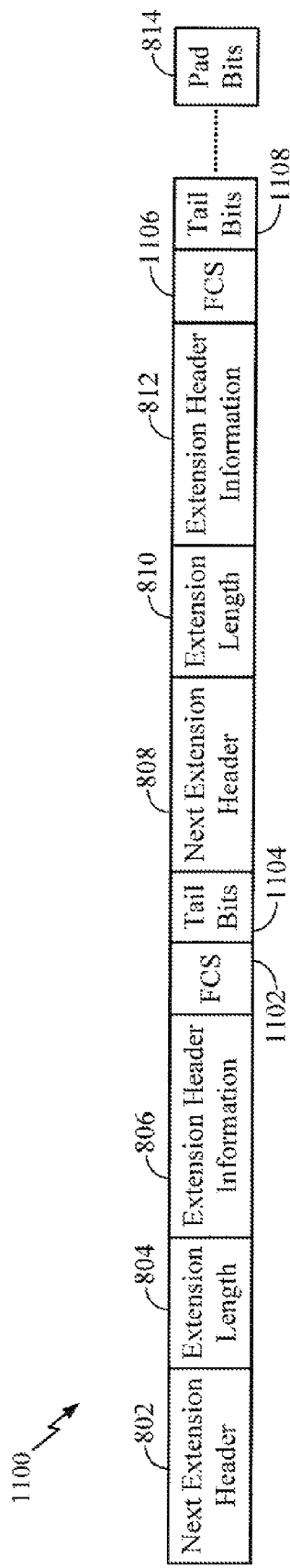
FIG. 11 is an example extended PLCP header structure according to a third embodiment.

FIG. 11 is an example extended PLCP header structure according to a third embodiment. The illustrated extended PLCP header 1100 includes a first extension header having a first extension header indicator 802, a first extension length 804, first extension information 806, a first frame check sequence 1102, and first tail bits 1104. The extended PLCP header 1100 also includes a second extension header having a second extension header indicator 808, a second extension length 810, second extension information 812, a second frame check sequence 1106, and second tail bits 1108. The extended PLCP header 814 further includes pad bits 814, located after the extension headers. Although the illustrated PLCP header 1100 includes at least two extension headers, the PLCP header structure could include any number of extension headers.

The illustrated extended PLCP header 1100 may offer improved error detection and correction as compared to both the extended PLCP header 702 of FIG. 8 and the extended PLCP header 1000 of FIG. 10. In particular, the addition of a frame check sequence and tail bits to each extension header may decouple errors in the actual frame payload from errors in the extension header. Although only a first frame check sequence 1102, first tail bits 1104, second frame check sequence 1106, and second tail bits 1108 are illustrated, the addition of more extension headers to the PLCP header 1100 may result in the addition of more frame check sequences and tail bits.

Figure 12:
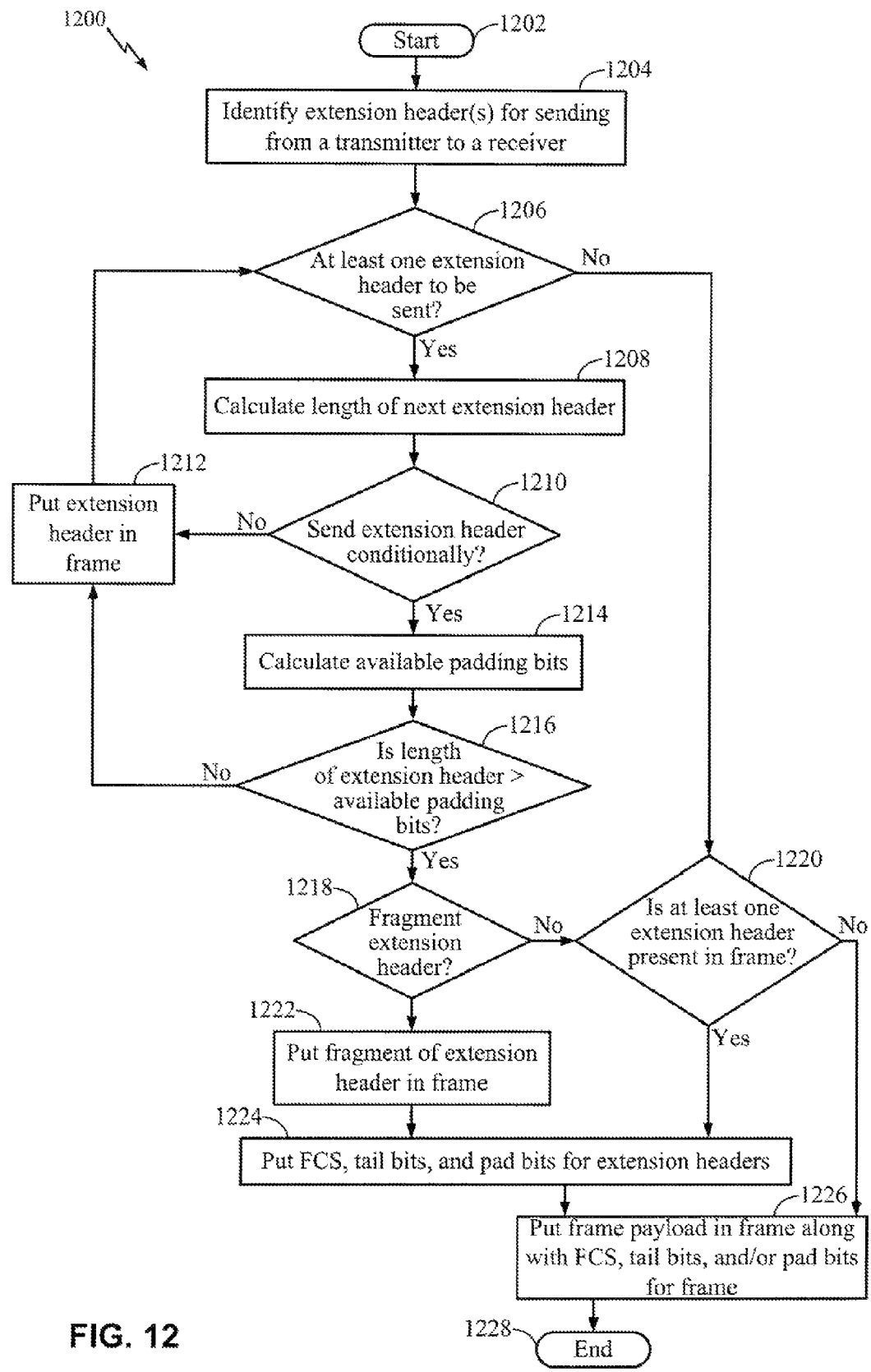
FIG. 12 is a method of extending a PLCP header according to one embodiment.

FIG. 12 is a method of extending a PCLP header according to one embodiment. It will be understood that not all of the illustrated steps are required, and that this method may be modified without departing from the spirit and scope of the invention. Additionally, this method may be implemented using one or more processors, formatters, interpreters, memories, and/or other devices, as will be described in further detail below. The illustrated method 1200, depicted from the point of view of a transmitting device (e.g., 102 or 106), starts at 1200. In an ensuing step 1202, the transmitting device identifies extension headers for sending to a receiving device (e.g., 102 or 106). A processor (e.g., 200 or 300) may perform this identification, and the identified extension headers may be present in a memory (e.g., 204 or 304), or come from another source, such as a wired network interface (e.g., 308).

In the ensuing decision step 1206, the transmitting device (e.g., 102 or 106) determines if there is at least one extension header to be sent. A processor (e.g., 200 or 300) may perform this determination. If the answer to the decision step is no, the method 1200 proceeds to a decision step 1220, to be described in detail further below.

If the answer to the inquiry in the decision step 1206 is yes, then the method 1200 proceeds to a step 1208, in which the transmitting device (e.g., 102 or 106) calculates the length of the next extension header. In one embodiment, this calculation is done in bits, while in another embodiment it is done in bytes. A processor (e.g., 200 or 300) may perform this calculation. In an ensuing decision step 1210, the transmitting device determines if extension headers are sent conditionally. A processor (e.g., 200 or 300) may perform this determination using a memory (e.g., 204 or 304).

If the answer to the inquiry in the decision step 1210 is no, then the method 1200 proceeds to a step 1212, in which the transmitting device (e.g., 102 or 106), puts the extension header in the frame. The extension header could be put into the frame by, for example, a processor (e.g., 200 or 300) and/or a message formatter (e.g., 202 or 302). Additionally, the extension header could be put in the frame at a variety of locations. For example, with reference to FIG. 7, the extension header could be inserted into the pad bits 412 of the PSDU 406. In another embodiment, the extension header is put in the payload of the PSDU 406 between the PLCP header 404 and the actual frame payload 410, using a daisy chain of extension headers, as described above with reference to FIG. 6. After the step 1212 is completed, the method 1200 returns to the decision step 1206, which was described above.

If the answer to the inquiry in the decision step 1210 is yes, then the method 1200 proceeds to a step 1214, in which the transmitting device (e.g., 102 or 106) calculates the available padding bits (e.g., 412). A processor (e.g., 200 or 300) may perform this calculation.

In an ensuing decision step 1216, the transmitting device determines if the length of extension header is greater than the available padding bits. The transmitting device may use a processor (e.g., 200 or 300) or a variety of other modules to make this determination. If the answer to the inquiry is no, the method 1200 proceeds to the step 1212, which was described above.

If the answer to the inquiry in the decision step 1216 is yes, the method 1200 proceeds to the decision step 1218, in which the transmitting device determines if extension headers are being fragmented. A processor (e.g., 200 or 300) may perform this determination using a memory (e.g., 204 or 304). The process of fragmenting one or more extension headers was described above with reference to FIG. 9. If the answer to the inquiry is no, the method 1200 proceeds to the decision step 1220, to be described in detail later below.

If the answer to the inquiry in the decision step 1218 is yes, the method 1200 proceeds to the step 1222, in which the transmitting device puts the fragment of extension header into the frame. A processor (e.g., 200 or 300) and/or message formatter (e.g., 202 or 302) could put the fragment of extension header into the frame. The fragment of extension header could be inserted into the pad bits 412 of the PSDU 406, as was described above with reference to FIG. 7.

After completing the step 1222, the method 1200 proceeds to the ensuing step 1224, in which the transmitting device may put FCS (e.g., 1002), tail bits (e.g., 1004) and pads bits (e.g., 1006) for the one or more extension headers into the frame. In another embodiment, the FCS, tail bits, and/or pad bits for extension headers may not be put into the frame. For example, if the method 1200 used the header extension structure illustrated in FIG. 8, the FCS and tail bits would not be inserted. Furthermore, a processor (e.g., 200 or 300) and/or a message formatter (e.g., 202 or 302) could put the FCS, tail bits, and pad bits into the frame. Additionally, the extension headers and hence the FCS, tail bits, and pad bits of extension headers could be put in the frame at a variety of locations. For example, with reference to FIG. 7, the extension headers along with the FCS, tail bits, and pad bits of the extension headers could be inserted into the pad bits 412 of the PSDU 406. In another embodiment, the FCS, tail bits, and pad bits of the extension headers may be put in the payload of the PSDU 406 between the PLCP header 404 and the actual frame payload 410, using a daisy chain structure, as described above with reference to FIG. 6.

After the step 1224 is completed, the method 1200 proceeds to the ensuing step 1226, in which the transmitting device puts the frame payload including any extension headers, into the PPDU or frame structure (e.g., 400). In embodiment, the transmitting device may put FCS, tail bits, and pad bits for the PSDU into the PPDU and/or frame structure (e.g., 400). The frame payload may be put into the frame structure using a processor (e.g., 200 or 300) and/or by a message formatter (e.g., 202 or 302). After completing the step 1224, the method 1200 proceeds to an ending step 1228.

In the decision step 1220, the transmitting device determines if at least one extension header is present in the frame. A processor (e.g., 200 or 300) may perform this determination. If the answer to the decision step is yes, the method 1200 proceeds to the step 1224, which was described above. If the answer to the decision step is no, the method 1200 proceeds to the step 1226, which was also described above.

In one embodiment, shorter medium access durations may be achieved in the communication system 200. As discussed above, in one embodiment, if A≥P the PSDU duration may be extended, where A corresponds to the total length of the extension header elements desired to be inserted and P corresponds to the number of information bits in 6 OFDM symbols at a given PHY data rate. For example, there may be three scenarios for transmitting extension headers: Case A where the extension header is transmitted without an FCS, Case B where the extension header is transmitted with separate FCS and tail bits, and Case C where the extension header is transmitted as a separate PSDU. T refers to the medium access duration for extension headers. In this embodiment, $T_{6SYM}$ refers to the duration of 6 OFDM symbols which may be 1.875 us. For Cases A and B, the expected medium access duration may be shown by the equation $E(T)=(N+q)*T_{6SYM}$, where N is the number of additional 6 OFDM symbol durations that will be needed to transmit the extension header and q is the probability that an additional 6 OFDM symbol duration will be needed.

For Case C, because the extension header is transmitted in the payload of a separate PSDU, a short inter-frame space (SIFS) may be used. In addition, the separate PSDU may also use a separate preamble and a separate header. Thus, the time to transmit the extension header in a separate PSDU may be shown by the equation $T=T_{SIFS}+T_{PREAMBLE}+T_{PLCPHEADER}+T_{PAYLOAD}$, where $T_{SIFS}$ refers to the time for the SIFS, $T_{PREAMBLE}$ refers to the time to transmit the preamble, $T_{PLCPHEADER}$ refers to the time to transmit the PLCP header, and $T_{PAYLOAD}$ refers to the time to transmit the payload. In this embodiment, $T_{SIFS}=10$ us, $T_{PREAMBLE}=9.375$ us, and $T_{PLCPHEADER}=3.75$ us. Also, $T_{PAYLOAD}=(N+z)*T_{6SYM}$, where z is 0 if A mod P is 0, and 1 otherwise (A is the total length of the extension header and P is the number of information bits in 6 OFDM symbols for a given data rate PHY rate).

The difference between the expected medium access durations for Cases B and C may be shown by the equation $\Delta T=T_{SIFS}+T_{PREAMBLE}+T_{PLCPHEADER}+(z-q)*T_{6SYM}$.

As shown above, the medium access durations for Cases A and B are less than the medium access duration for Case C. In Case C, extra overhead may be incurred as a result of transmitting the extension header data in the payload of a separate PSDU. However, in Cases A and B, the extension header data may fit within the padding bits or payload of a previous packet. Thus, a separate PSDU may not be necessary resulting in a shorter medium access duration for Cases A and B. In one embodiment, the medium access durations for all cases may decrease as the data rate of the communication rate 100 increases. The absence of static overheads and/or the efficient use of the padding area in the payload may decrease the medium access duration (e.g., increase the efficiency) of the communication system 100.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

The embodiments presented herein and other embodiments are further described in greater detail in the attached Appendix. While the specification describes particular examples of the present invention, those of ordinary skill may devise variations of the present invention without departing from the inventive concept. For example, the teachings herein refer to circuit-switched network elements but are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor may read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Also, a connection may be used to transmit and/or receive computer-readable medium. For example, the software may be transmitted from a website, server, or other remote source using a coaxial cable, fiber optic cable, twisted pair, digital subscriber line (DSL), or wireless technologies such as infrared, radio, and microwave. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A communication device for transmitting at least a first packet in a wireless communication system, wherein the first packet comprises a header field, a payload field, and a padding field, the communication device comprising:
    a memory configured to store a first extension header and a second extension header;
    a message formatter in communication with at least one of the processor and the memory, the message formatter configured to:
        indicate in the header field the presence of the first extension header; and
        insert at least one portion of the first extension header in at least one of the payload field and the padding field of the first packet, the payload field and the padding field being separate from the header field; and
        indicate in a field of the first extension header the presence of the second extension header, and
        insert at least one portion of the second extension header in at least one of the payload field and the padding field of the first packet; and
    a transmitter configured to transmit the first packet and a second packet, wherein the second packet comprises a header field, a payload field, and a padding field, and wherein the first extension header or the second extension header comprises a first portion and a second portion, and wherein the message formatter is further configured to insert the first portion in at least one of the payload field and the padding field of the first packet and the second portion in at least one of the payload field and the padding field of the second packet, and wherein the length of the first portion is less than or equal to the length of the padding field of the first packet.

2. The communication device of claim 1, further comprising a processor configured to determine at least one bit that does not fit in a plurality of bits occupying the header field.

3. The communication device of claim 1, wherein the message formatter comprises at least one of a general purpose processor, a digital signal processor, an application specific integrated circuit, a programmable logic device, discrete gate logic, transistor logic, and discrete hardware components.

4. The communication device of claim 1, wherein the message formatter is further configured to insert the at least one portion of the first extension header in a beginning portion of the payload field of the first packet.

5. The communication device of claim 4, wherein the message formatter is further configured to modify a length field of the header field of the first packet based on, at least in part, the length of the at least one portion of the first extension header.

6. The communication device of claim 1, wherein the at least one portion of the first extension header inserted comprises a content field.

7. The communication device of claim 1, wherein the at least one portion of the first extension header inserted comprises a frame check sequence and tail bits.

8. The communication device of claim 1, wherein the at least one portion of the first extension header comprises a length field indicating the length of the at least one portion of the first extension header.

9. The communication device of claim 1, wherein the message formatter is further configured to insert the first extension header in the padding field of the first packet if the length of the first extension header is less than or equal to the length of the padding field of the first extension header.

10. A communication device for transmitting at least a first packet in a wireless communication system, wherein the first packet comprises a header field, a payload field, and a padding field, the communication device comprising:
means for storing a first extension header, wherein the means for storing is further configured to store a second extension header;
means for indicating in the header field the presence of the first extension header and inserting at least one portion of the first extension header in at least one of the payload field and the padding field of the first packet, the payload field and the padding field being separate from the header field, wherein the indicating and inserting means is in communication with the storing means, wherein the means for indicating is further configured to indicate in a field of the first extension header the presence of the second extension header, and to insert at least one portion of the second extension header in at least one of the payload field and the padding field of the first packet;
means for transmitting the first packet and a second packet, wherein the second packet comprises a header field, a payload field, and a padding field, and wherein the first extension header or the second extension header comprises a first portion and a second portion, and wherein the message formatter is further configured to insert the first portion in at least one of the payload field and the padding field of the first packet and the second portion in at least one of the payload field and the padding field of the second packet, and wherein the length of the first portion is less than or equal to the length of the padding field of the first packet.

11. The communication device of claim 10, further comprising means for determining at least one bit that does not fit in a plurality of bits occupying the header field.

12. The communication device of claim 10, wherein the means for indicating comprises at least one of a general purpose processor, a digital signal processor, an application specific integrated circuit, a programmable logic device, discrete gate logic, transistor logic, and discrete hardware components.

13. The communication device of claim 10, wherein the means for indicating is further configured to insert the at least one portion of the first extension header in a beginning portion of the payload field of the first packet.

14. The communication device of claim 13, wherein the means for indicating is further configured to modify a length field of the header field of the first packet based on, at least in part, the length of the at least one portion of the first extension header.

15. The communication device of claim 10, wherein the at least one portion of the first extension header inserted comprises a content field.

16. The communication device of claim 10, wherein the at least one portion of the first extension header inserted comprises a frame check sequence and tail bits.

17. The communication device of claim 10, wherein the at least one portion of the first extension header comprises a length field indicating the length of the at least one portion of the first extension header.

18. The communication device of claim 10, wherein the means for indicating is further configured to insert the first extension header in the padding field of the first packet if the length of the first extension header is less than or equal to the length of the padding field of the first extension header.

19. A method of communicating at least a first packet in a wireless communication system, wherein the first packet comprises a header field, a payload field, and a padding field, the method comprising:
storing a first extension header and a second extension header;
indicating in the header field of the first packet the presence of the first extension header and inserting at least one portion of the first extension header in at least one of the payload field and the padding field of the first packet, the payload field and the padding field being separate from the header field;
determining if at least one bit is available in the second extension header for transmission, wherein the at least one bit is additional to the plurality of bits occupying the header field; and
indicating in a field of the first extension header the presence of the second extension header and inserting at least one portion of the second extension header in at least one of the payload field and the padding field of the first packet; and
transmitting the first packet and a second packet, wherein the second packet comprises a header field, a payload field, and a padding field, and wherein the first extension header or the second extension header comprises a first portion and a second portion, and wherein the message formatter is further configured to insert the first portion in at least one of the payload field and the padding field of the first packet and the second portion in at least one of the payload field and the padding field of the second packet, and wherein the length of the first portion is less than or equal to the length of the padding field of the first packet.

20. The method of claim 19, further comprising determining at least one bit that does not fit in a plurality of bits occupying the header field.

21. The method of claim 19, further comprising inserting the at least one portion of the first extension header in a beginning portion of the payload field of the first packet.

22. The method of claim 21, further comprising modifying a length field of the header field of the first packet based on, at least in part, the length of the at least one portion of the first extension header.

23. The method of claim 19, wherein the at least one portion of the first extension header inserted comprises a content field.

24. The method of claim 19, wherein the at least one portion of the first extension header inserted comprises a frame check sequence and tail bits.

25. The method of claim 19, wherein the at least one portion of the first extension header comprises a length field indicating the length of the at least one portion of the first extension header.

26. The method of claim 19, further comprising inserting the first extension header in the padding field of the first packet if the length of the first extension header is less than or equal to the length of the padding field of the first extension header.

27. A computer readable product, comprising:
a non-transitory computer-readable storage medium encoded with instructions that, when executed by a computer, cause the computer to:
store a first extension header of a first packet comprising a header field, a payload field, and a padding field;
store a second extension header;
indicate in the header field of the first packet the presence of the first extension header, to insert at least one portion of the first extension header in at least one of the payload field and the padding field of the first packet, to indicate in a field of the first extension header the presence of the second extension header, and to insert at least one portion of the second extension header in at least one of the payload field and the padding field of the first packet, the payload field and the padding field being separate from the header field; and
transmit the first packet and a second packet, wherein the second packet comprises a header field, a payload field, and a padding field, and wherein the first extension header or the second extension header comprises a first portion and a second portion, and wherein the message formatter is further configured to insert the first portion in at least one of the payload field and the padding field of the first packet and the second portion in at least one of the payload field and the padding field of the second packet, and wherein the length of the first portion is less than or equal to the length of the padding field of the first packet.

28. The computer readable product of claim 27, further comprising code for causing a computer to determine at least one bit that does not fit in a plurality of bits occupying the header field.

29. The computer readable product of claim 27, further comprising code for causing a computer to insert the at least one portion of the first extension header in a beginning portion of the payload field of the first packet.

30. The computer readable product of claim 27, further comprising code for causing a computer to modify a length field of the header field of the first packet based on, at least in part, the length of the at least one portion of the first extension header.

31. The computer readable product of claim 27, wherein the at least one portion of the first extension header inserted comprises a content field.

32. The computer readable product of claim 27, wherein the at least one portion of the first extension header inserted comprises a frame check sequence and tail bits.

33. The computer readable product of claim 27, wherein the at least one portion of the first extension header comprises a length field indicating the length of the at least one portion of the first extension header.

34. The computer readable product of claim 27, further comprising code for causing a computer to insert the first extension header in the padding field of the first packet if the length of the first extension header is less than or equal to the length of the padding field of the first extension header.

* * * * *